(12) United States Patent
Jones et al.

(10) Patent No.: US 7,576,024 B2
(45) Date of Patent: Aug. 18, 2009

(54) CATALYST COMPOSITION COMPRISING ANIONIC CLAY AND RARE EARTH METALS, ITS PREPARATION AND USE IN FCC

(75) Inventors: William Jones, Cambridge (GB);
Dennis Stamires, Dana Point, CA (US);
Paul O'Connor, Hoevelaken (NL);
Michael F. Brady, Studio City, CA (US)

(73) Assignee: Albemarle Netherlands B.V., Amsterdam (NL)

( * ) Notice: Subject to any disclaimer, the term of this patent is extended or adjusted under 35 U.S.C. 154(b) by 0 days.

(21) Appl. No.: 10/582,177

(22) PCT Filed: Dec. 6, 2004

(86) PCT No.: PCT/EP2004/013914

§ 371 (c)(1),
(2), (4) Date: Jul. 5, 2007

(87) PCT Pub. No.: WO2005/058484

PCT Pub. Date: Jun. 30, 2005

(65) Prior Publication Data

US 2008/0039314 A1    Feb. 14, 2008

Related U.S. Application Data

(60) Provisional application No. 60/527,758, filed on Dec. 9, 2003.

(30) Foreign Application Priority Data

Jan. 9, 2004    (EP)    ................................. 04075064

(51) Int. Cl.
B01J 29/06    (2006.01)
(52) U.S. Cl. ............................. 502/68; 502/73; 502/80; 502/84
(58) Field of Classification Search .................. 502/68, 502/73, 80, 84
See application file for complete search history.

(56) References Cited

U.S. PATENT DOCUMENTS

| 2002/0092812 A1 | 7/2002 | Stamires et al. |
| 2002/0110520 A1 | 8/2002 | Stamires et al. |
| 2002/0111263 A1 * | 8/2002 | Stamires et al. ............... 502/63 |

FOREIGN PATENT DOCUMENTS

EP    0 278 535 A1    8/1988

\* cited by examiner

*Primary Examiner*—Elizabeth D Wood
(74) *Attorney, Agent, or Firm*—Jeremy J. Kliebert

(57) ABSTRACT

The invention relates to a composition comprising anionic clay and rare earth metal hydroxy carbonate. This composition can suitably be used in FCC for the reduction of NOx and/or SOx emissions, the reduction of the S and/or N-content in fuels, and as a metal trap.

Figure 1:
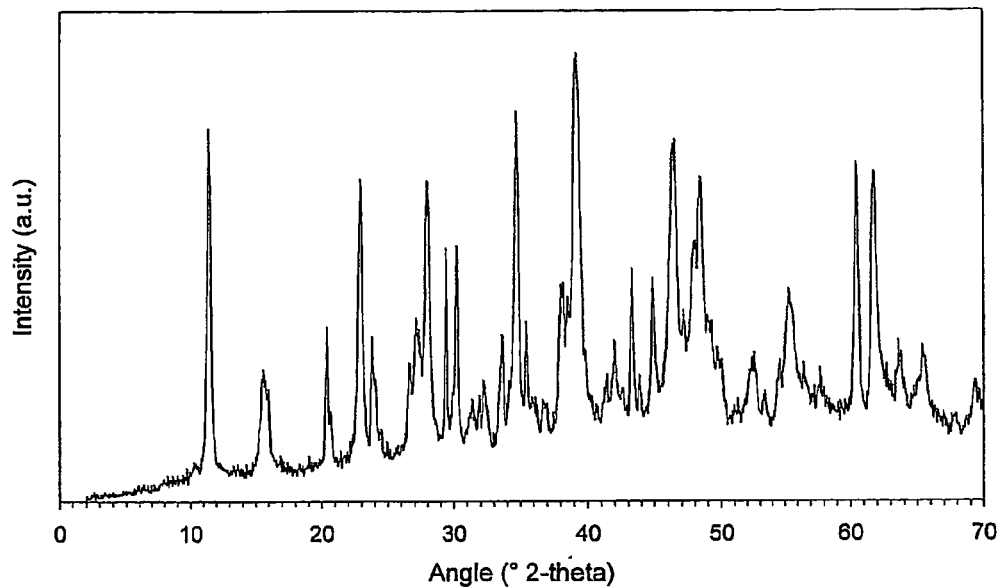

The composition can be prepared by precipitating a divalent metal salt, a trivalent metal salt, and a rare earth metal salt to form a precipitate, calcining the precipitate at 200-800° C., and rehydrating the precipitate in the presence of a carbonate source to form a composition comprising anionic clay and a rare earth metal hydroxy carbonate.

5 Claims, 1 Drawing Sheet

CATALYST COMPOSITION COMPRISING ANIONIC CLAY AND RARE EARTH METALS, ITS PREPARATION AND USE IN FCC

This application is the National Stage of International Patent Application PCT/EP2004/13914, filed on Dec. 6, 2004, which application claims priority from U.S. Application No. 60/527,758, filed Dec. 9, 2003, the disclosures of which are incorporated herein by reference.

The present invention relates to a catalyst composition comprising anionic clay and rare earth metals, a process for preparing this composition, and the use of this composition for catalytic purposes.

From the prior art it is known to use anionic clays in FCC processes for the reduction of $SO_x$ emissions.

For instance, EP 0 278 535 discloses fluidisable cracking catalyst compositions containing anionic clay or a calcined anionic clay, the (calcined) anionic clay serving as $SO_x$ binding material. The anionic clay is prepared by co-precipitation of a divalent and a trivalent metal salt. A rare earth metal may be incorporated into the anionic clay either by co-precipitating a rare earth metal salt-together with the divalent and trivalent metal salts, or by impregnating the anionic clay, when embedded in a matrix, with a rare earth metal salt.

The object of the present invention is to provide a new anionic clay and rare earth metal-containing composition suitable for use as $SO_x$ sorbent. The invention relates to a catalyst composition comprising anionic clay, lanthanum (hydr)oxide carbonate, and cerium oxide. The invention further relates to a process for the preparation of this composition.

The term "lanthanum (hydr)oxide carbonate" includes lanthanum hydroxide carbonates, lanthanum oxide carbonates, their anhydrous and hydrated forms, and mixtures thereof. Examples of lanthanum hydroxide carbonates are compounds with the formulae $La_2(CO_3)_2(OH)_2 \cdot nH_2O$, $La_2(CO_3)_2(OH)_2$ (e.g. ancylite), and $La(OH)CO_3$. Examples of lanthanum oxide carbonates are compounds with the formulae $La_2O_2CO_3$ and $La_2O(CO_3)_2 \cdot xH_2O$.

For the Powder X-Ray Diffraction (PXRD) patterns of several lanthanum hydroxide carbonates reference is made to ICDD Powder Diffraction File Nos. 24-0547, 24-0548, 26-0815, 46-0368, 49-0981, 29-0744, and 70-1774, respectively. XRD patterns of several $La_2O_2CO_3$ polymorphs are disclosed by A. Olafsen et al., *J. Solid State Chem.*, 158 (2001) 14-24, while the PXRD pattern of $La_2O(CO_3)_2 \cdot xH_2O$ is disclosed in ICDD Powder Diffraction File No. 28-0512.

For the PXRD pattern of $CeO_2$ reference is made to ICDD Powder Diffraction File No. 34-0394.

Anionic clays—also called hydrotalcite-like materials or layered double hydroxides—are materials having a crystal structure consisting of positively charged layers built up of specific combinations of divalent and trivalent metal hydroxides between which there are anions and water molecules, according to the formula

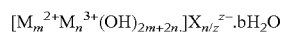

wherein $M^{2+}$ is a divalent metal, $M^{3+}$ is a trivalent metal, and X is an anion with valency z. m and n have a value such that m/n=1 to 10, preferably 1 to 6, more preferably 2 to 4, and most preferably close to 3, and b has a value in the range of from 0 to 10, generally a value of 2 to 6, and often a value of about 4. Hydrotalcite is an example of a naturally occurring anionic clay wherein Mg is the divalent metal, Al is the trivalent metal, and carbonate is the predominant anion present. Meixnerite is an anionic clay wherein Mg is the divalent metal, Al is the trivalent metal, and hydroxyl is the predominant anion present.

The catalyst composition according to the invention preferably comprises 10 to 50 wt %, more preferably 20 to 30 wt % of the lanthanum (hydr)oxide carbonate, calculated as $La_2O_3$ and based on the total weight of the catalyst composition calculated as oxides. The cerium oxide ($CeO_2$) content of the catalyst composition preferably is 5 to 20 wt %, more preferably 5 to 10 wt %. The balance is formed by anionic clay and optionally additives.

Preparation of the Catalyst Composition According to the Invention

The catalyst composition according to the present invention can be prepared by a process comprising the steps of:
a. forming a precipitate from a solution comprising a divalent metal salt, a trivalent metal salt, a lanthanum salt, and a cerium salt,
b. calcining the precipitate at 200-800° C., and
c. rehydrating the calcined precipitate in the presence of a carbonate source to form a catalyst composition comprising anionic clay, lanthanum (hydr)oxide carbonate, and cerium oxide.

Precipitation

A precipitate is formed from an aqueous solution comprising a divalent metal salt, a trivalent metal salt, a lanthanum salt, and a cerium salt. Suitable salts of these metals are water-soluble salts, e.g. nitrates, chlorides, sulphates, acetates, formiates, etc. Especially preferred are nitrates.

Suitable divalent metals include magnesium, zinc, nickel, copper, iron, cobalt, manganese, calcium, barium, strontium, and combinations thereof. Suitable trivalent metals include aluminium, gallium, indium, iron, chromium, vanadium, cobalt, manganese, cerium, niobium, nickel, lanthanum, and combinations thereof.

In order to form the precipitate, a base is added to the solution containing the dissolved salts. Any base can be used, such as NaOH, $NaHCO_3$, $NH_4OH$, ammonium carbonate, etc., although it is preferred to use bases that do not contain sodium, as the presence of sodium is known to cause deterioration of the catalytic performance of many catalyst compositions, especially FCC catalyst catalyst compositions.

The pH required for precipitation depends on the metals used, but is generally above 7, preferably above 8.

The divalent metal, trivalent metal, lanthanum, and cerium can be co-precipitated together, but it is also possible to precipitate the metals in a specific order. For instance, the divalent and the trivalent metal may be precipitated first, after which lanthanum and cerium are precipitated. It is also possible to precipitate first the divalent metal, cerium, and lanthanum, followed by precipitation of the trivalent metal, or to precipitate the trivalent metal, cerium and lanthanum, followed by precipitation of the divalent metal. In between subsequent precipitation steps, the precipitate formed can be aged. Examples of suitable precipitation processes can be found in EP 0 554 968.

Calcination

The precipitate, after having been isolated from the solution and optionally after washing and/or milling, is calcined at a temperature of 200-800° C., more preferably 300-700° C., and most preferably 350-600° C. Calcination is conducted for 0.25-25 hours, preferably 1-8 hours, and most preferably 2-6 hours. All commercial types of calciners can be used, such as fixed bed or rotating calciners. Calcination can be performed in various atmospheres, e.g., in air, oxygen, inert atmosphere (e.g. $N_2$), steam, or mixtures thereof.

The so-obtained calcined material must contain rehydratable oxide. The amount of rehydratable oxide formed depends on the types of divalent metal and trivalent metal used and on the applied calcination temperature. An example of a non-rehydratable oxide is a spinel phase.

Preferably, no aging step is applied between the precipitation and the calcination step.

Rehydration

Rehydration of the calcined material is conducted by contacting the calcined mixture with water and a carbonate source. The carbonate source can be air and/or a carbonate salt (e.g. sodium carbonate, but preferably ammonium carbonate) dissolved in water. Rehydration can be performed by passing the calcined mixture over a filter bed with sufficient liquid spray of water or an aqueous solution, or by suspending the calcined mixture in water or an aqueous solution. The temperature of the liquid during rehydration preferably is between 25 and 350° C., more preferably between 25 and 200° C., more preferably still between 50 and 150° C., the temperature of choice depending on the nature of the anionic clay and the type and amount of metal source. Rehydration is performed for about 20 minutes to 20 hours, preferably 30 minutes to 8 hours, more preferably 1-4 hours. If rehydration is performed in an aqueous suspension, said suspension can be milled using high-shear mixers, colloid mixers, ball mills, kneaders, electrical transducers that can introduce ultrasound waves into a slurry, etc.

Rehydration can be performed batch-wise or continuously, optionally in a continuous multi-step operation. An example of such multi-step operation is the process described in WO 03/078055. For example, if rehydration is performed in a suspension, said suspension may be prepared in a feed preparation vessel, after which the suspension is continuously pumped through two or more conversion vessels. Additional additives, acids, or bases may be added to the suspension in any of the conversion vessels if so desired. Each of the vessels can be adjusted to its own desirable temperature.

During rehydration, anions other than carbonate can be added to the liquid. Examples of suitable anions include inorganic anions like $NO_3^-$, $NO_2^-$, $SO_4^{2-}$, $SO_3NH_2$, $SCN^-$, $S_2O_6^{2-}$, $SeO_4^-$, $F^-$, $Cl^-$, $Br^-$, $I^-$, $ClO_3^-$, $ClO_4^-$, $BrO_3^-$, and $IO_3^-$, silicate, aluminate, and metasilicate, organic anions like acetate, oxalate, formate, long-chain carboxylates (e.g. sebacate, caprate, and caprylate (CPL)), alkylsulfates (e.g. dodecylsulfate (DS) and dodecylbenzenesulfate), stearate, benzoate, phthalocyanine tetrasulfonate, and polymeric anions such as polystyrene sulfonate, polyimides, vinylbenzoates, and vinyidiacrylates, and pH-dependent boron-containing anions, bismuth-containing anions, thallium-containing anions, phosphorus-containing anions, silicon-containing anions, chromium-containing anions, vanadium-containing anions, tungsten-containing anions, molybdenum-containing anions, iron-containing anions, niobium-containing anions, tantalum-containing anions, manganese-containing anions, aluminium-containing anions, and gallium-containing anions. Additionally, it is also possible to incorporate metals during rehydration, such as alkaline earth metals (for instance Mg, Ca and Ba), transition metals (for example Cr, Mn, Fe, Co, Ti, Zr, Cu, Ni, Zn, Mo, W, V, Sn, Nb, Rh, Ru), actinides, additional rare earth metals, noble metals such as Pt and Pd, silicon, aluminium, gallium, titanium, and mixtures thereof.

The composition resulting from this rehydration step is the catalyst composition according to the present invention. It is expected that the lanthanum will be mainly present in this catalyst composition as lanthanum hydroxy carbonate.

The catalyst composition according to the present invention may further be mixed with conventional catalyst ingredients, such as matrix or filler materials (e.g. clay such as kaolin, titanium oxide, zirconia, alumina, silica, silica-alumina, bentonite, et cetera), and molecular sieve material (e.g. zeolite Y, zeolite USY, zeolite RE-USY, zeolite beta, ZSM-5, etc.). The resulting mixture is then shaped to form shaped bodies. Suitable shaping methods include spray-drying, pelletising, extrusion (optionally combined with kneading), beading, or any other conventional shaping method used in the catalyst and sorbent fields.

Additives can incorporated into the composition by, e.g., (i) co-precipitating the additive together with the divalent, trivalent, lanthanum, and cerium salts in the first step of the preparation process according to the invention, (ii) impregnating the calcined precipitate that was formed as intermediate in the process according to the invention with the additive, (iii) having the additive present in the rehydration solution during the last step of the process according to the invention, or (iv) impregnating a composition comprising anionic clay, lanthanum (hydr)oxide carbonate, and cerium oxide with the additive.

Suitable additives include compounds containing transition metals (e.g. V, Mo, W, Cu, Zn, Ni, Co, Fe, Mn, Fe, Ru, Rh, Pt, and/or Cr), phosphorus, and/or other rare earth metals such as lanthanum hydroxide.

If so desired, the catalyst composition according to the present invention may be calcined again after rehydration.

Use of the Catalyst Composition

As illustrated by the Examples below, this composition is very suitable for use in FCC processes for the reduction of $SO_x$ emissions. In the same process, the composition can reduce $NO_x$ emissions, reduce the sulfur and nitrogen contents of fuels like gasoline and diesel, and entrap metals like V and Ni.

The catalyst composition according to the present invention can also be used in or as a catalyst or catalyst additive in other hydrocarbon conversion processes, such as hydrogenation, dehydrogenation, hydrocracking, hydroprocessing (hydrodenitrogenation, hydrodesulfurisation, hydrodemetallisation), polymerisation, steam reforming, and base-catalysed reactions. It may also be used as a catalyst in gas-to-liquid processes, such as Fischer-Tropsch.

The catalyst composition according to the invention can be added to the FCC unit as such, or in a composition containing conventional catalyst ingredients, such as matrix or filler materials (e.g. clay such as kaolin, titanium oxide, zirconia, alumina, silica, silica-alumina, bentonite, etc.), and molecular sieve material (e.g. zeolite Y, zeolite USY, zeolite RE-USY, zeolite beta, ZSM-5, etc.).

For use as a metal trap, the catalyst composition according to the invention preferably comprises Mg—Al anionic clay; for reducing the sulfur content of fuels, Zn—Al anionic clay is preferably present; Cu—Al and Mg—Co anionic clays are preferred for reduction of $NO_x$ emissions, while Mg—Al and Mg—Fe anionic clays are very suitable for reducing $SO_x$ emissions.

FIGURES

FIG. 1 presents a Powder X-ray Diffraction Pattern (using Cu K-alpha radiation) of a composition comprising a Mg—Al anionic clay and a lanthanum (hydr)oxide carbonate.

Figure 2:
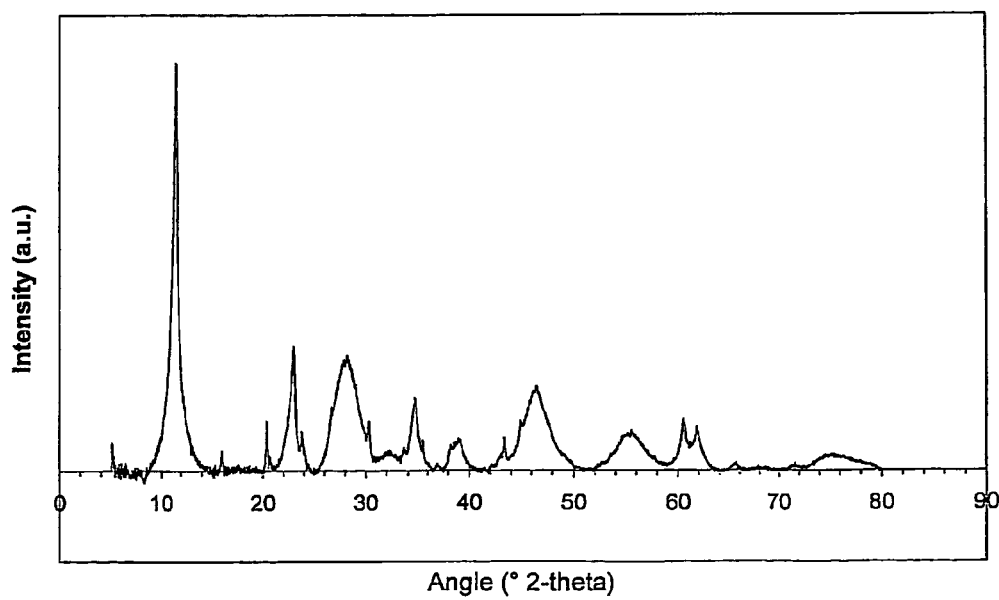

FIG. 2 presents a Powder X-ray Diffraction Pattern (using Cu K-alpha radiation) of a composition comprising a Mg—Al anionic clay, lanthanum (hydr)oxide carbonate, and cerium oxide.

EXAMPLES

Comparative Example 1

An aqueous solution comprising $Mg(NO_3)_2$, $Al(NO_3)_3$, and $La(NO_3)_3$ with an Mg/Al molar ratio of 3 and a La-content of 30 wt % (calculated as $La_2O_3$ and based on the total weight of the resulting catalyst composition calculated as oxides) was prepared. The pH of the solution was adjusted to 10 using NaOH, thereby forming a precipitate. The precipitate was filtered, washed, and dried, and subsequently calcined at 350° C. for four hours. The calcined product was then rehydrated in an aqueous solution containing 1 M $Na_2CO_3$ at 85° C. overnight.

The resulting product was isolated. Its Powder X-Ray Diffraction (PXRD) pattern is shown in FIG. 1. The reflections at 11.4 and 22.9° 2-theta (d=7.76 and 3.88 Å) indicate the presence of anionic clay; the reflections at 15.7, 20.4, 23.8, and 30.2° 2-theta (d=5.65, 4.35, 3.73, and 2.96) indicate the presence of lanthanum hydroxide carbonate.

Example 2

Comparative Example 1 was repeated, except that instead of 30 wt % La, the solution contained 15 wt % La and 15 wt % Ce (calculated as $La_2O_3$ and $CeO_2$, respectively, and based on the total weight of the resulting catalyst composition calculated as oxides).

The PXRD pattern of the resulting composition is shown in FIG. 2. The reflections at about 11.4 and 23° 2-theta indicate the presence of anionic clay; the small reflections at about 16, 20.3, 23.8, and 30.2° 2-theta indicate the presence of lanthanum hydroxide carbonate; the broad reflection at about 29° 2-theta indicates the presence of $CeO_2$.

Example 3

The products of Comparative Example 1 and Examples 2 were tested for their de-$SO_x$ ability in FCC processes using the thermographimetric test described in *Ind. Eng. Chem. Res.* Vol. 27 (1988) pp. 1356-1360. A standard commercial de-$SO_x$ additive was used as a reference.

Either 17.3 or 27.3 mg (see Table below) of the samples were heated under nitrogen at 700° C. for 30 minutes. Next, the nitrogen was replaced by a gas containing 0.32% $SO_2$, 2.0% $O_2$, and balance $N_2$ with a flow rate of 200 ml/min. After 30 minutes the $SO_2$-containing gas was replaced by nitrogen and the temperature was reduced to 650° C. After 15 minutes, nitrogen was replaced by pure $H_2$ and this condition was maintained for 20 minutes. This cycle was repeated 3 times. The sample's $SO_x$ uptake and its release during hydrogen treatment were measured as the sample's weight change (in %). The $SO_x$ uptake and release during the third cycle are shown in Table I. This Table also displays the effectiveness ratio, which is defined as the ratio of $SO_x$ release over $SO_x$ uptake. The ideal effectiveness ratio is 1, which means that all the $SO_x$ that was taken up has been released again, leading to a longer catalyst life.

TABLE I

| Sample | sample weight (mg) | $SO_x$ uptake (% wt increase) | $SO_x$ release (% wt decrease) | Effectiveness ratio |
|---|---|---|---|---|
| Comparative Example 1 | 27.3 | 14 | 1.3 | 0.09 |
| Example 2 | 17.3 | 35 | 27 | 0.77 |
| Commercial additive | 17.3 | 28 | 2 | 0.07 |
| Commercial additive | 27.3 | 17 | 1.3 | 0.08 |

This table shows that the $SO_x$ release and, hence, the effectiveness ratio of the composition according to the invention is higher than that of a standard commercial de-$SO_x$ additive and of a composition comprising only anionic clay and lanthanum hydroxide carbonate.

The invention claimed is:
1. Catalyst composition comprising anionic clay, lanthanum (hydr)oxide carbonate, and cerium oxide.
2. Composition according to claim 1 comprising 10-50 wt % lanthanum (hydr)oxide carbonate, 5-20 wt % cerium oxide, and balance anionic clay, all calculated as oxides and based on the total weight of the composition.
3. Composition according to claim 2 wherein the anionic clay is an Mg—Al, Zn—Al, Cu—Al, Mg—Co, and/or Mg—Fe anionic clay.
4. Process for the preparation of a catalyst composition according to claim 1, comprising the steps of:
   forming a precipitate from a solution comprising a divalent metal salt, a trivalent metal salt, a lanthanum salt, and a cerium salt,
   a. calcining the precipitate at 200-800° C., and
   b. rehydrating the calcined precipitate in the presence of a carbonate source to form a composition comprising anionic clay, lanthanum (hydr)oxide carbonate, and cerium oxide.
5. A process in which the catalyst composition according to claim 1 is added to an FCC unit.

* * * * *